F. C. MAEGLY.
SCALE TICKET.
APPLICATION FILED DEC. 30, 1907.
918,346.
Patented Apr. 13, 1909.
2 SHEETS—SHEET 1.
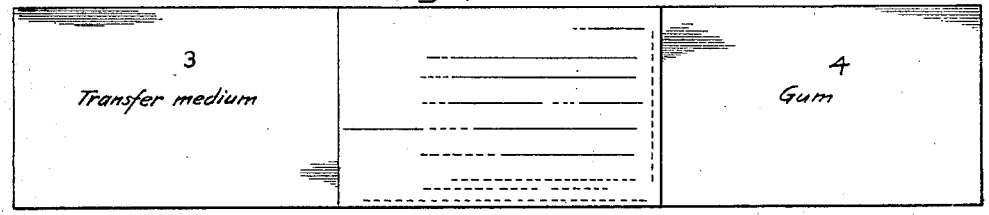
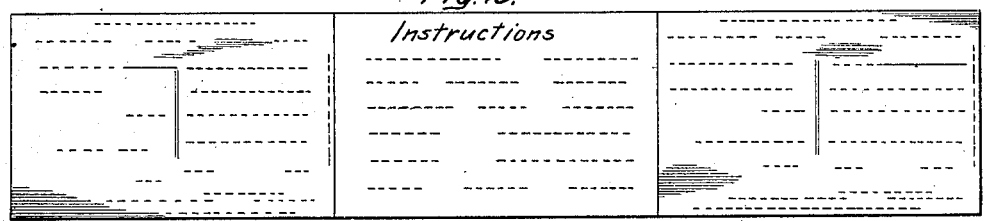
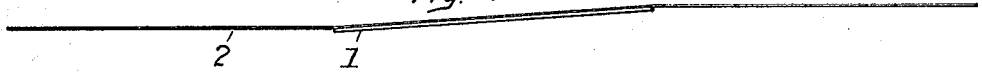
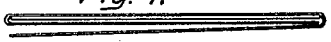
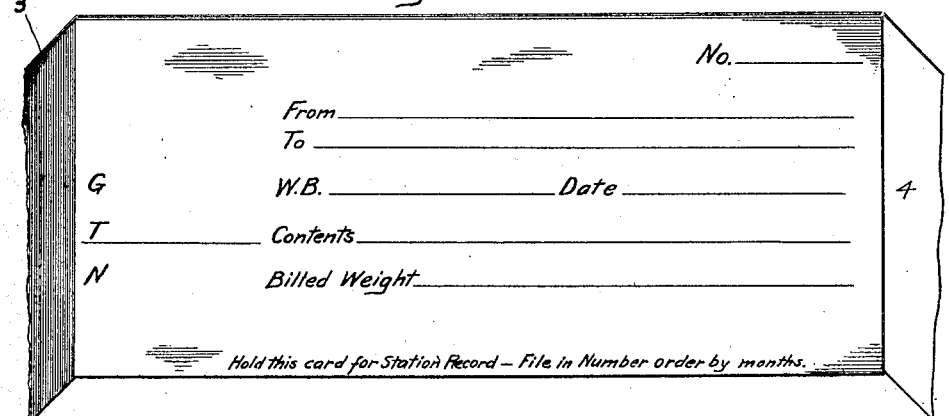
WITNESSES:
INVENTOR.
Frederick C. Maegly
BY
Sheridan & Wilkinson
ATTORNEY.

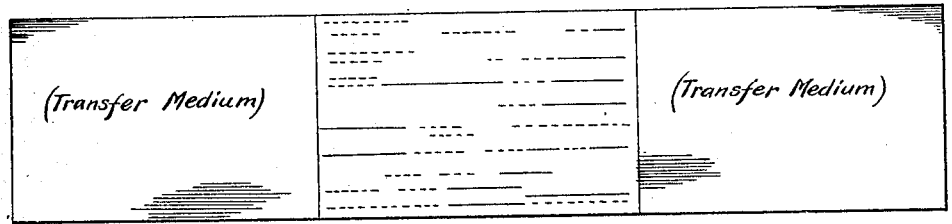

UNITED STATES PATENT OFFICE.

FREDERICK C. MAEGLY, OF CHICAGO, ILLINOIS.

SCALE-TICKET.

No. 918,346.　　　　　Specification of Letters Patent.　　　Patented April 13, 1909.

Application filed December 30, 1907. Serial No. 408,549.

*To all whom it may concern:*

Be it known that I, FREDERICK C. MAEGLY, a citizen of the United States, residing at Chicago, in the county of Cook and State of Illinois, have invented certain new and useful Improvements in Scale-Tickets, of which the following is a specification.

The object of my invention is to provide an improved record card or scale ticket to be used by weighmasters, the ticket being provided with a plurality of sheets, one or more of them provided with a transfer medium whereby duplicate records may be made, and one of them, if desired, having a gummed surface, whereby it may be attached to the way-bill.

A frequent source of error in billing freight under the existing system arises from the fact that the weight of the freight, as ascertained by deducting the tare or light weight of the car from the gross weight as found upon the track scales, is recorded by the weighmaster either by noting the weight with a pencil or pen or by the use of the type registering device with which many track scales are equipped. The memorandum of the weight of the shipment as so recorded is transmitted to the billing clerk generally being transcribed one or more times during this process and by him copied upon the way-bill. The re-copying of these weights upon the way-bill is a source of frequent error and much annoyance, and often causes loss to the railroads or over-charges to the shippers. The use of my improved scale ticket provided with the gummed duplicate record, which is designed to be attached directly to the way-bill, avoids the necessity of re-copying the figures and thus eliminates the principal source of error in way-bills.

In the drawings—Figure 1 is a front view of my improved scale ticket. Fig. 2 is a reverse view of the same. Fig. 3 is an edge view of the same. Fig. 4 is a view of the scale ticket with the extended ends folded over into position for use. Fig. 5 is a view of a modification. Fig. 6 is an enlarged view of one of the ends of the scale ticket. Fig. 7 is a view of a modified scale ticket for use in recording the light weight of cars. Fig. 8 is an enlarged view of the blank form printed on the scale ticket illustrated in Fig. 7.

My improved scale ticket comprises a rigid base 1 to which is secured, by paste or otherwise, a paper strip 2 which projects beyond the base at each end a distance approximately equal to the length of the base. The extended ends or leaves 3 and 4 are designed to be folded over the front of the base 2 in the manner illustrated in Fig. 4. As illustrated in Fig. 1, the extended end 3 is coated with a transfer medium and the end 4 is gummed. The central portion of the strip of paper may have instructions to weighmasters printed thereon, as illustrated in Fig. 2, and the end portions will have blank forms printed thereon, as illustrated in that figure, providing spaces in which the date when the car is weighed, the place where weighed, the gross weight, the tare and the net weight may be entered, together with the initials, car number, any remarks desired, capacity of the car and the signature of the sworn weighmaster may be entered. These entries being made when the card is folded, as shown in Fig. 4, the data will be recorded upon the parts 3 and 4. The part 3, together with the base to which it is attached, will be retained as a station record, while the gummed part 4 will be torn off and affixed to the way-bill. By this means there will be no possibility of any weight being entered on the way-bill other than that recorded at the track scale. In fact, where the scale is equipped with type registering beam the scale ticket may be inserted in the registering apparatus of the track scale and the actual scale weight as recorded thereby directly stamped upon the scale ticket. The front of the rigid base may also have a blank form printed thereon in which additional data relative to the shipment may be entered, such as the name of the consignor, consignee, the number of the way-bill, the date, etc.

In the form of my invention illustrated in Fig. 7, both of the projecting ends of the scale ticket are coated with a transfer medium, the projecting ends and the rigid base all being printed with the same blank form. Provision is thus made for making three facsimile records. In this form no provision is made for gumming one of the slips to a way-bill, and this form of scale ticket is not intended for that purpose. The blanks upon this form of scale ticket provide spaces for the entry of the date upon which the car is weighed, the place at which weighed, initials, car number, kind of car, the new light weight, the old light weight, the difference, cause of the difference, whether car is dry and clean, the station symbol, the date of weighing, the date of re-stenciling, and signature of weighmaster. This form of scale ticket is designed for use in re-weighing empty cars and inscribing the new light weight thereon. It is well-known that the weight of empty cars, commonly known as the light weight or tare, varies from time to time, owing to the drying of the lumber in the cars and the making of repairs and substitution of new parts, addition of fixtures, etc. Inasmuch as the weight of freight shipped is determined by deducting the tare or light weight of the car as stenciled thereon from the gross weight, it is highly important that the correct light weights be stenciled upon the cars, and that the light weights be corrected from time to time, in order to insure against discrepancies between the recorded light weight and the actual light weight of the car, due to the drying of the lumber of which it is made or to repairs, or other causes. The making of such correction in the stenciled weights upon cars is a matter of great difficulty owing to the congested condition of freight terminals and the constant moving of the cars from place to place. These difficulties have resulted in interfering with the re-weighing and the re-stenciling of cars to such an extent that the light weights as stenciled upon cars are almost invariably inaccurate, thus leading to inaccuracy in the weight of shipments as billed. As a general rule, cars become lighter in service with the result that the inaccuracies above referred to become a source of great loss to the railroads.

My scale ticket, as above described and illustrated in Fig. 7 of the drawing, is designed for the purpose of affording a quick and convenient means for making triplicate records of the light weight of cars. As is well-known, large shippers have their own track scales and weigh all cars light before loading them, in order to insure a correct billing of their freight. The cars, however, are not re-stenciled, owing to the fact that they remain upon the siding but a short time and the proper appliances are not generally at hand for re-stenciling. My improved scale ticket affords a convenient means for making a permanent record by weighmasters, one of the copies being retained by the station agent, another forwarded to the car accountant, and the third to the division superintendent or other official. Through the records so made, a light weight card may be stenciled and forwarded to the place where the car is located and attached to the same by means of nails, or a suitable holder.

My invention as illustrated in Figs. 1 to 6 of the drawing obviates the errors now arising from the copying of the records made by the weighmaster in his books or upon his cards or tickets, and affords means whereby the original record of the scale weight, including the type registered record of the scale beam itself and the signature of the employee who performed the weighing are made a part of the way-bill. In the form of my invention illustrated in Figs. 7 and 8 convenient and accurate means are provided for making triplicate records for use in recording the correct weights upon cars.

What I claim is:

1. A record card comprising a rigid base, and a sheet of paper secured to said base and extending beyond the base at each end, one of the extended ends of said sheet being gummed, and both of said extended ends having blank forms printed thereon, said forms being so positioned as to register when the extended ends are folded over the base.

2. A record card comprising a rigid base, and a sheet of paper secured to said base and extending beyond the base at each end, one of the extended ends of said sheet being coated with a transfer medium.

3. A record card comprising a rigid base, and a sheet of paper secured to said base and extending beyond the base at each end, one of the extended ends of said sheet being coated with a transfer medium and the other being gummed.

4. A record card comprising a rigid base having a blank form printed on one side thereof, a sheet of paper secured to the other side of said base and extending beyond the base at each end, the extending ends of said sheet of paper having blank forms printed thereon and adapted to register with each other when said extending ends are folded over said base.

5. A record card comprising a rigid base having a blank form printed on one side thereof, a sheet of paper secured to the other side of said base and extending beyond the base at each end, the extending ends of said sheet of paper having blank forms printed thereon and adapted to register with each other when said extending ends are folded over said base, one of said extending ends being gummed.

6. A record card comprising a rigid base having a blank form printed on one side thereof, a sheet of paper secured to the other side of said base and extending beyond the base at each end, the extending ends of said sheet of paper having blank forms printed thereon and adapted to register with each other when said extending ends are folded over said base, one of said extending ends being coated with transfer medium.

7. A record card comprising a rigid base having a blank form printed on one side thereof, a sheet of paper secured to the other side of said base and extending beyond the base at each end, the extending ends of said sheet of paper having blank forms printed thereon and adapted to register with each other when said extending ends are folded over said base, one of said extending ends being gummed and the other being coated with transfer medium.

8. A record card comprising a rigid base, leaves affixed to said base and projecting beyond the same, one of said leaves being coated with transfer medium and the other being gummed.

FREDERICK C. MAEGLY.

Witnesses:
WALTER A. SCOTT,
ANNIE C. COURTENAY.